(12) United States Patent
Bianchi et al.

(10) Patent No.: US 9,085,986 B2
(45) Date of Patent: Jul. 21, 2015

(54) ROTOR BLADE

(71) Applicant: AIRBUS HELICOPTERS, Marignane, Cedex (FR)

(72) Inventors: Laurent Bianchi, Marseilles (FR); Nicolas Isidore, Les Milles (FR)

(73) Assignee: Airbus Helicopters, Marignane Cedex (FR)

( * ) Notice: Subject to any disclaimer, the term of this patent is extended or adjusted under 35 U.S.C. 154(b) by 461 days.

(21) Appl. No.: 13/687,392

(22) Filed: Nov. 28, 2012

(65) Prior Publication Data

US 2013/0142658 A1 Jun. 6, 2013

(30) Foreign Application Priority Data

Dec. 1, 2011 (FR) ...................................... 11 03664

(51) Int. Cl.
*F01D 5/14* (2006.01)
*B64C 11/26* (2006.01)
*B64C 27/473* (2006.01)
*B64C 27/48* (2006.01)

(52) U.S. Cl.
CPC ................ *F01D 5/147* (2013.01); *B64C 11/26* (2013.01); *B64C 27/473* (2013.01); *B64C 27/48* (2013.01)

(58) Field of Classification Search
CPC ....... F01D 5/147; B64C 11/26; B64C 27/473; B64C 27/48
See application file for complete search history.

(56) References Cited

U.S. PATENT DOCUMENTS

| 3,923,422 A | 12/1975 | Ianniello |
| 4,302,155 A | 11/1981 | Grimes |
| 5,222,297 A | 6/1993 | Graff |
| 6,659,722 B2 * | 12/2003 | Sehgal et al. ............. 416/134 A |
| 6,764,280 B2 * | 7/2004 | Sehgal et al. ................. 416/104 |

FOREIGN PATENT DOCUMENTS

| GB | 1427158 A | 3/1976 |
| WO | 9308017 A1 | 4/1993 |

OTHER PUBLICATIONS

Search Report and Written Opinion; Application No. FR 1103664; dated Jul. 12, 2012.

* cited by examiner

*Primary Examiner* — Igor Kershteyn
(74) *Attorney, Agent, or Firm* — Brooks Kushman P.C.

(57) ABSTRACT

A blade (1) having a fitting (2) for fastening to a hub and an aerodynamic element (10) having a main spar (20) surrounding a bushing (31) for transmitting centrifugal forces and connected to said fitting (2). The blade includes a transmission member (40) for transmitting torsional forces and co-operating with a torsion box. The fitting (2) includes an annular recess (200) defining a first recess (201) and a second recess (202) that are separated by a top separator (211) and a bottom separator (212) locally obstructing the annular recess (200), the blade (1) including a first ring (71) and a second ring (72) reversibly arranged respectively in the first recess (201) and in the second recess (202), each ring (71, 72) being fastened to the top separator (211) and to the bottom separator (212), a ring (71) including a fastener pin (73) passing through said bushing (31) and said fitting (2) in co-operation with the other ring (72).

12 Claims, 6 Drawing Sheets

ROTOR BLADE

CROSS REFERENCE TO RELATED APPLICATIONS

This application claims priority to French patent application No. FR 11 03664 filed on Dec. 1, 2011, the disclosure of which is incorporated in its entirety by reference herein.

BACKGROUND OF THE INVENTION (1) Field of the Invention

The present invention relates to a rotor blade, and in particular to a rotor blade of an aircraft.

(2) Description of Related Art

While moving in rotation, a rotor blade is subjected to a torsor of forces and consequently it is subjected to centrifugal force and also to multiple forces due to flapping movements, to drag, and to torsion. Torsion is caused in particular by changes of pitch seeking to modify the angle of inclination of the blade relative to the plane of the hub supporting the blade. These forces naturally generate bending moments and torsional moments.

The forces and moments to which the blade is subjected and due in particular to centrifugal force and to torsion must then be transmitted to the hub by the blade.

The means for fastening the blade to the hub are therefore subjected to forces and to moments that can be destructive, the term "force" being used below for simplification purposes to designate both said forces proper and moments. Furthermore, it can be understood that it can be difficult to inspect a blade in order to see damage, if any. It is also advantageous to optimize the fastener means in order to limit their weight and in order to reduce the aerodynamic drag they generate in flight.

Document WO 93/08017 describes a blade having a spar subassembly including a retaining element made of metal and of cellular material having fibers braided there about.

Document U.S. Pat. No. 4,302,155 describes a blade provided with a metal base pierced in its center in order to receive a pilot tube. That base includes a cylindrical portion and a portion in the form of a cut defining a cavity, with foam extending from that cavity.

The foam and the base are then covered in fabric forming a rigid skin.

The blade also includes collars for fastening to a hub and clamping onto the rigid skin and the base.

All of the forces to which the blade is subjected appear to transit via the base, with the base being difficult to view because of the presence of the rigid skin.

Other known documents include GB 1 427 158 and U.S. Pat. No. 3,923,422.

The document GB 1427158 describes a blade cooperating with a fitting for fastening to a hub. The fitting includes two cheeks and an opening.

BRIEF SUMMARY OF THE INVENTION

An object of the present invention is thus to propose a blade in which the zone for connection to a hub optionally presents optimized strength while being suitable for visual inspection for maintenance purposes.

According to the invention, a blade is provided with a fitting for fastening to a hub, and with an aerodynamic element, the aerodynamic element having a main spar extending longitudinally span-wise from an attachment zone to a distal zone. The attachment zone of the main spar surrounds a bushing for transmitting centrifugal forces, which bushing is connected to the spar.

The blade also includes a transmission member for transmitting torsional forces, which transmission member is provided with first and second half-shells together clamping on the attachment zone. Each half-shell has a first portion co-operating with the bushing and a second portion co-operating with a torsion box of the blade that surrounds the distal zone of the main spar, the first portion being inserted in the fitting in reversible manner.

This blade is remarkable in particular in that the fitting includes an annular recess defining a first recess and a second recess that are separated by a top separator and a bottom separator. Each separator thus locally closes the annular recess in order to subdivide the annular recess into a first recess and a second recess.

The first and second recesses thus lie in the same transverse plane. Furthermore, the first recess and the second recess optionally describe circular arcs.

The blade then has a first ring and a second ring, which rings are arranged in reversible manner respectively in the first recess and in the second recess, each ring being fastened to the top separator and to the bottom separator, a ring including a fastener pin that passes through the bushing and the fitting, the fastener pin co-operating with the other ring.

The aerodynamic element thus has a box that may be referred to as a "central box" that is provided both with a main spar suitable in particular for transmitting to a hub the centrifugal forces to which the blade is subjected in operation, and also with a torsion box suitable in particular for transmitting to a hub the torsional forces to which the blade is subjected in operation.

Thus, when the blade is fastened to a hub via its fastener fitting, the forces to which the aerodynamic element of the blade are subjected during rotation of the hub are transmitted to the fastener fitting of the blade, said fitting transmitting said forces to the hub.

More precisely, the centrifugal forces are transmitted to the fitting via the bushing on which the main spar is clamped and the torsional forces are transmitted to the fitting via the transmission member co-operating with the torsion box. By way of example, the rings may prevent the half-shells from turning relative to the fitting so as to enable torsional forces to be conveyed from the aerodynamic element to the fitting.

Thus, since the transmission member is distinct from the bushing, the blade possesses a path for centrifugal forces that is distinct from a path for torsional forces, thereby optimizing tolerance to damage.

Furthermore, the various paths are easily viewed for maintenance purposes, since the aerodynamic element can be removed from the fitting in order to view the bushing and the transmission member. The zones in which forces are concentrated and that are likely to be degraded during fabrication and use of the blade are thus easily accessible in order to be inspected.

At least one half-shell may also include at least one opening enabling the main spar to be viewed from outside the fitting.

Finally, the blade is very compact, thereby optimizing aerodynamic drag in flight.

The blade may include one or more of the following characteristics.

In a first embodiment, first ring may include a first fastener pin, the second ring being provided with a second fastener pin suitable for penetrating in said first fastener pin.

Thus, the first fastener pin is inserted in the bushing of the aerodynamic element, with the second fastener pin being inserted in the first fastener pin.

The bushing then co-operates with the first fastener pin, which first fastener pin co-operates with the second fastener pin.

The centrifugal forces exerted on the blade are transmitted in particular to the fitting via the bushing and the fastener pins of the rings.

In a second embodiment, the first ring may include a first fastener pin, the second ring being provided with a hole suitable for receiving the first fastener pin.

The centrifugal forces exerted on the blade are then transmitted in particular to the fitting via the bushing and the first fastener pin of the rings.

Independently of the embodiment, each ring may include a central portion shaped to match the first portion of the transmission member in order to surround it in part.

It can be understood that the term "first portion of the transmission member" is used herein to mean the part of the transmission member that includes the first portions of the half-shells.

In the context of the first embodiment, each central portion carries a fastener pin penetrating into the bushing of the aerodynamic element.

In contrast, in the context of the second embodiment, the central portion carries a fastener pin. The other central portion then has a hole in which said fastener pin penetrates after passing through said bushing.

In a preferred variant of the first and second embodiments, the fitting may have at least one guide groove co-operating with a lug of a shell. At least one ring then includes a projection suitable for closing the guide groove in order to seal it.

The first portion of the torsional force transmission member is inserted in the fitting in accurate manner with each lug of the first portion being guided by a guide groove.

Furthermore, in order to avoid external elements penetrating in unwanted manner into the fitting via the guide groove, at least one of the rings includes a projection for closing off said guide groove.

In addition, each guide groove may open out into a circularly arcuate slideway contained in a first plane parallel to a second plane containing the first and second recesses.

Thus, the blade includes a fastener system that can be referred to as a "bayonet" system.

In order to fasten the aerodynamic element to the fitting, the first portion of the transmission member is pushed into the fitting by causing each lug to slide in a guide groove. At the end of this movement in translation, the aerodynamic element is turned so that each lug moves in a slideway towards a "locked" position.

Each slideway may include an axial housing facing a lug when the transmission member is locked to the fitting so as to prevent a lug from moving axially and from turning in an axial housing in the event of the transmission member moving accidentally in translation relative to the fitting.

Furthermore, at least a first portion of the half-shells include a first flat, and at least one ring includes a second flat complementary to the first flat. Each second flat may be made on a central portion of a ring facing the first portion and matching the shape of said first portion.

Co-operation between the first flat and the second flat then prevents the first portion from turning relative to the second portion.

Thus, the blade may include:

means for preventing the fitting from moving in translation relative to the transmission member in translation, such as at least one lug co-operating with a slideway; and/or means for preventing the fitting from turning relative to the transmission member in rotation, such as a first flat of the first portion co-operating with a second flat of at least one ring.

The means for preventing relative movement may also include a key or some other known system for preventing movement in rotation.

Furthermore, each ring may extend from a first end towards a second end, and the blade may possess a first securing pin for securing the first end of the first ring to the first end of the second ring and to the top separator, the blade also possessing a second securing pin securing the second end of the first ring to the second end of the second ring and to the bottom separator.

Each ring may then have a central portion facing the bushing, at least one central portion carrying a fastener pin. The central portion is then extended by a first end and a second end, each facing a separator.

Each end may include a plane surface, each separator thus being clamped between two plane surfaces.

In another aspect, each half-shell may include an eyelet suitable for clamping onto a first end portion of the bushing, each half-shell having an oblong viewing hole.

It is thus easy to arrange the half-shells on the main spar.

Alternatively, each half-shell may include an eyelet suitable for clamping onto an end portion of the bushing, and a zone matching the shape of the eyelet of the other half-shell.

Furthermore, the invention may be applied to a blade having a plurality of spars.

Thus, the blade may have a front secondary spar and a rear secondary spar arranged transversely on either side of the central spar, and each ring may include fastener means for fastening to a secondary spar.

Such fastener means may comprise a clevis secured to the ring, each clevis co-operating via a pin with a cylindrical sleeve secured to a secondary spar.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
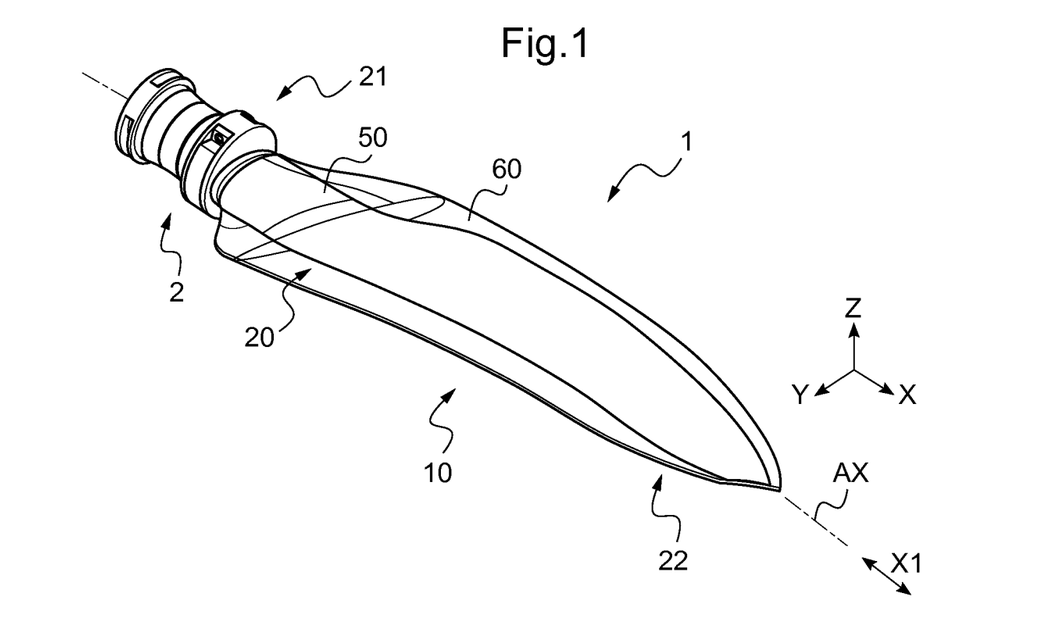
FIG. 1 is a view showing a blade of the invention.

FIG. 1 shows a blade 1 having an aerodynamic element 10 and a fitting 2 for fastening the aerodynamic element 10 to a hub, e.g. a propeller hub or a rotor hub. The fitting 2 may also include means for controlling the pitch of the aerodynamic element, which means are not shown in the figures for convenience.

The aerodynamic member comprises a main spar 20 (not visible in FIG. 1) for taking up at least a fraction of the centrifugal forces to which the blade 1 is subjected while rotating about an axis of rotation. The main spar 20 may be made of composite materials, and it may extend from an attachment zone 21 surrounding a bushing that co-operates with the fitting 2, towards a distal zone 22.

The main spar 20 also co-operates with a transmission member for transmitting torsional forces in association with a torsion box 50, the outer covering 60 of the blade 1 being arranged around the torsion box 50.

Thus, the blade 1 includes main transmission means for transmitting centrifugal forces, i.e. the bushing around which the attachment zone of the main spar is wound, and a main transmission member for transmitting torsional forces that is distinct from said main transmission means.

The centrifugal and torsional forces are thus conveyed to the fitting 2 mainly via two distinct paths.

Figure 2:
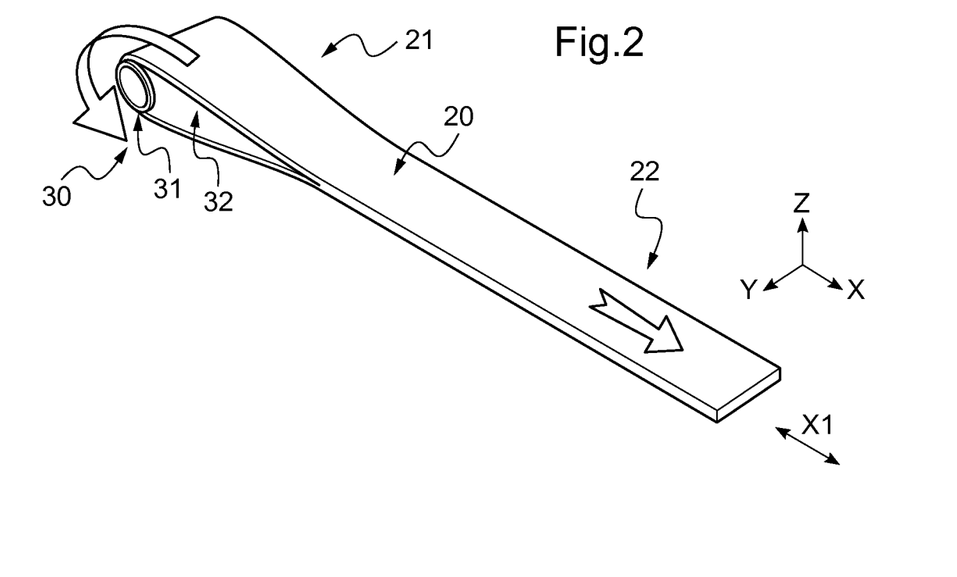
FIG. 2 is a view showing central spar.

With reference to FIG. 2, a main spar 20 is fabricated extending from an attachment zone 21 towards a distal zone 22. The attachment zone 21 is in particular passed around centrifugal force transmission means including at least one bushing 31 or at least one filler foam 32.

The bushing 31 may be a cylinder of circular section.

The main spar 20 is preferably a spar made of composite materials having fibers extending from the attachment zone 21 to the distal zone 22 along a longitudinal direction X1, i.e. span-wise relative to the blade that is to be made in order to take up the centrifugal forces exerted on the blade.

By way of example, the main spar 20 may also be made of composite sheet material of monolithic type. Other materials may be envisaged without going beyond the ambit of the invention.

Thus, fiber fabric may be draped while taking care to wind it around the transmission means and in particular around the bushing 31 using conventional methods, after which the assembly comprising the spar and the transmission means may be pre-polymerized.

It should be observed that said assembly may then be visually inspected in order to verify the absence of defects.

Figure 3:
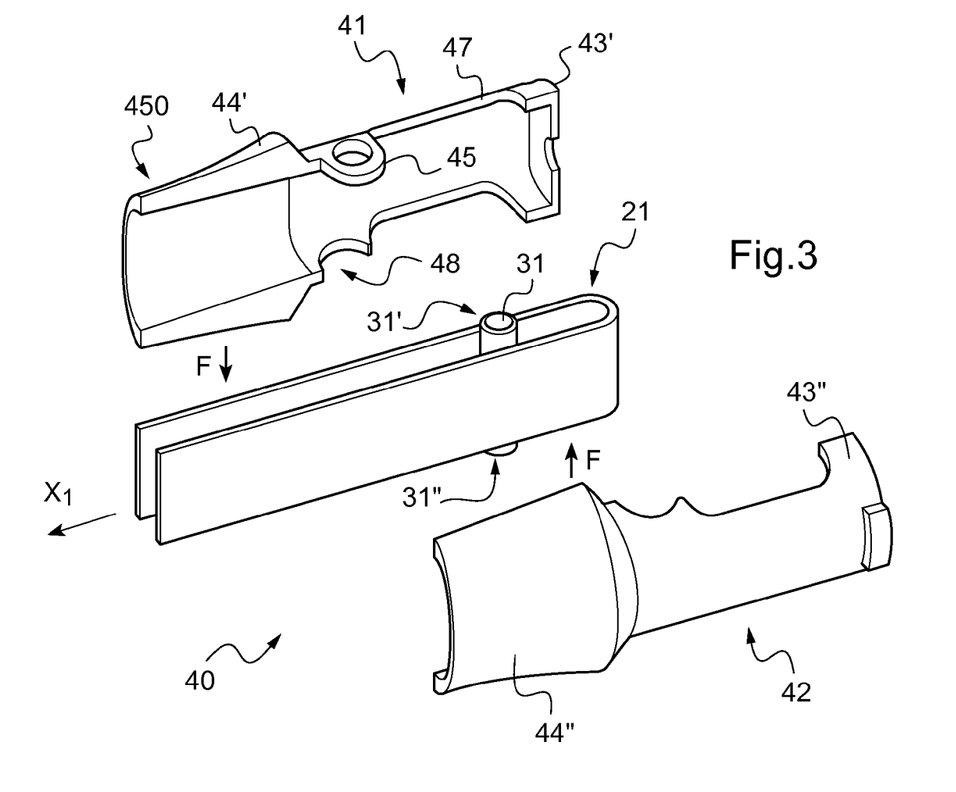
FIGS. 3 and 4 are views showing a transmission member in a first configuration.

At this stage, and with reference to FIG. 3, a transmission member 40 for transmitting torsional forces is then arranged on the attachment zone 21 of the main spar 20.

This transmission member 40 includes a first half-shell 41 and a second half-shell 42 that together clamp onto the attachment zone 21. The attachment member extends longitudinally from a first portion towards a second portion along an axis, which axis might possibly coincide with a long axis of the fitting 2.

The transmission member 40 may include means for assembling the half-shells together. One such assembly means may possess at least one positioning peg projecting from one of the half-shells in order to co-operate with a positioning orifice in the other half-shell.

In another aspect, a filler member is possibly housed between the main spar 20 and the transmission member 40.

Each half-shell 41, 42 then includes firstly a transversely perforated first portion 43', 43" for giving visual access to the bushing 31 or to the spar attachment zone, and secondly a second portion 44', 44" having the function of being connected to the torsion box.

It should be observed that each half-shell may be constituted by a single metal block, or may indeed comprise a plurality of parts that are fastened to one another.

The first portion 43' of the first half-shell 41 and the first portion 43" of the second half-shell 42 optionally together form a cylinder 46 suitable for being inserted in the fastening fitting 2.

Nevertheless, other shapes may be envisaged.

In addition, the second portion 44' of the first half-shell 41 and the second portion 44" of the second half-shell 42 as shown together form a frustoconical surface 450 suitable for being in contact with said torsion box 50. For example, the frustoconical surface 450 is obtained using a generator line following an elliptical path, i.e. the frustoconical surface is elliptical in section.

Such a frustoconical surface makes it possible to provide a frustoconical portion of a torsion box 50, and enhances attachment of an outer covering to such a frustoconical portion of the torsion box.

Furthermore, the first half-shell and the second half-shell may optionally be symmetrical so that together they form a shell having the function of being a member for transmitting the torsional forces to which the blade 1 is subjected.

Nevertheless, the first half-shell and the second half-shell shown could be asymmetrical.

In the variant of FIG. 3, each half-shell includes an eyelet 45 suitable for clamping onto an end portion 31', 31" of the bushing 31, and a zone 48 that matches the shape of the eyelet 45 in the other half-shell.

Thus, the half-shells are arranged on the main spar 20 by being moved along the arrows F shown in order to cause each eyelet 45 to move in translation over an end portion of the bushing.

It should be observed that at least one half-shell includes an opening 47.

Figure 4:
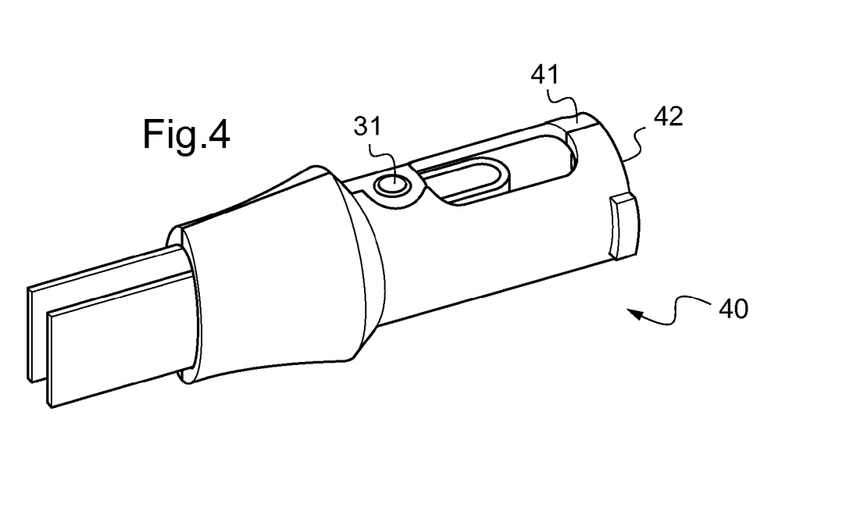

With reference to FIG. 4, after the above operation, the half-shells are touching and together they form the transmission member 40.

The transmission member then possesses at least one slot in its first portion enabling the main spar 20 to be viewed, each slot resulting from said openings 47.

Figure 5:
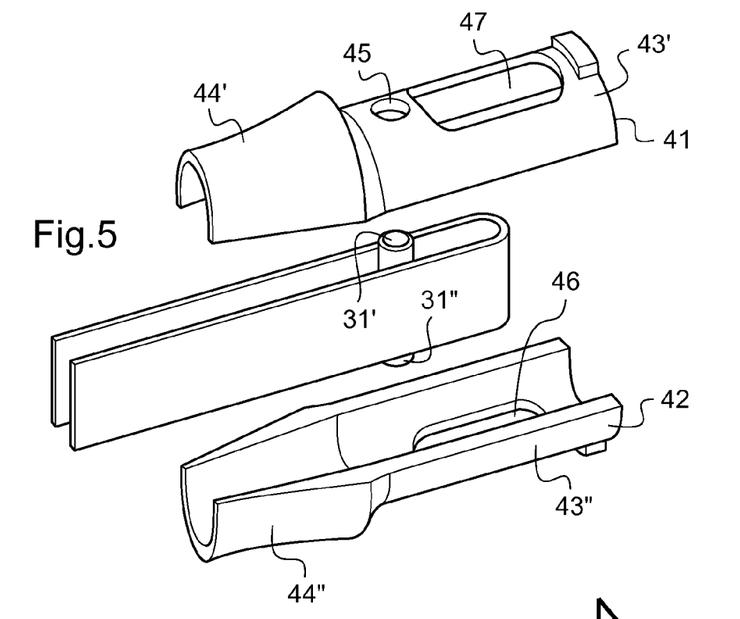
FIG. 5 is a view showing a transmission member in a second configuration.

In the alternative version of FIG. 5, each half-shell has an eyelet 45 suitable for clamping onto a first end portion 31' of said bushing 31, with each half-shell having an oblong viewing hole 46.

Independently of the variant, when the transmission member is in place on the attachment zone 21 of the main spar 20, a torsion box 50 is fabricated around the second portion 44', 44" of each half-shell 41, 42 and the distal zone 22 of the spar 20.

In order to finish off the aerodynamic element 10 of the blade, fibers are draped or wound that extend in a direction that presents an acute angle with said longitudinal direction X1, e.g. an angle of 45°.

The second portion may then be of small size insofar as said second portion takes up mainly the torsional forces of the blade.

Under such circumstances, an outer covering 60 is fabricated around the torsion box 50, e.g. by draping. Filler means are optionally arranged between the torsion box 50 and the outer covering 60. The filler means may serve as a support for positioning the covering.

At the end of this fabrication, the assembly comprising the main spar 20, the transmission member 20, torsion box 50, and the outer covering 60 is polymerized in order to finalize the aerodynamic element 10.

Figure 6:
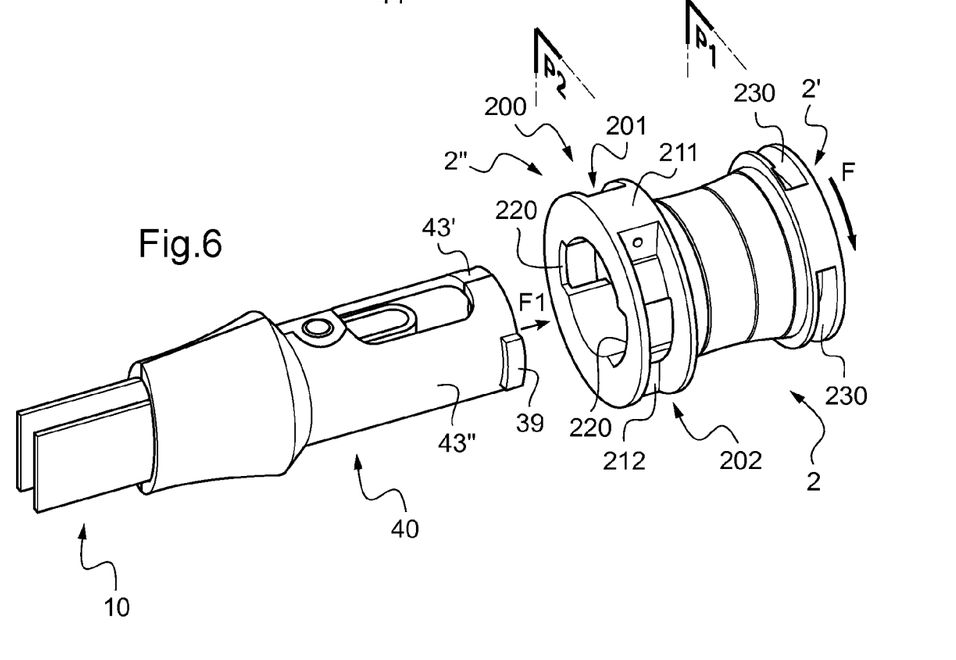
FIGS. 6 and 7 are views showing the arrangement of a transmission member in a fitting.

Finally, as shown in FIG. 6, the aerodynamic element 10 is inserted along an arrow F1 into a fitting 2. More precisely, the first portions 43', 43" of the half-shells are inserted in the fitting 2.

The fitting 2 extends longitudinally along a longitudinal axis from a first end 2' towards a second end 2". The second end 2" then represents the end of the fitting 2 that is closer to the second portions 44', 44" of the half-shells of the transmission member 40.

The fitting 2 preferably includes means for preventing movement in translation along said longitudinal axis in order to hold the fitting 2 stationary relative to the transmission member 40.

Such means for preventing movement in translation then comprise at least one guide groove 220, and specifically two guide grooves in the example shown.

Each guide groove is dimensioned to be capable of guiding a lug 39 of the transmission member 40 while the transmission member is being inserted in the fitting 2. Thus, each lug is guided by a guide groove 220 while moving in translation from the second end 2" towards the first end 2'.

Furthermore, the means for preventing movement in translation include one circularly arcuate slideway 230 per guide groove. Each guide groove leads to a circularly arcuate slideway 230 at the first end 2' of the fitting. It can thus be seen that the circularly arcuate slideways 230 are contained in a first transverse plane P1.

Consequently, an operator inserts the transmission member 40 into the fitting 2 by pushing the transmission member 40 in a longitudinal direction along arrow F1.

When each lug has reached the second end 2' of the fitting 2, the operator causes the transmission member 40 to turn about the longitudinal direction, as represented by arrow F2.

In addition, the fitting 2 may include means for preventing the fitting 2 from turning relative to the transmission member 40. Such means for preventing turning may comprise a key, for example.

Figures 7, 8, 9:
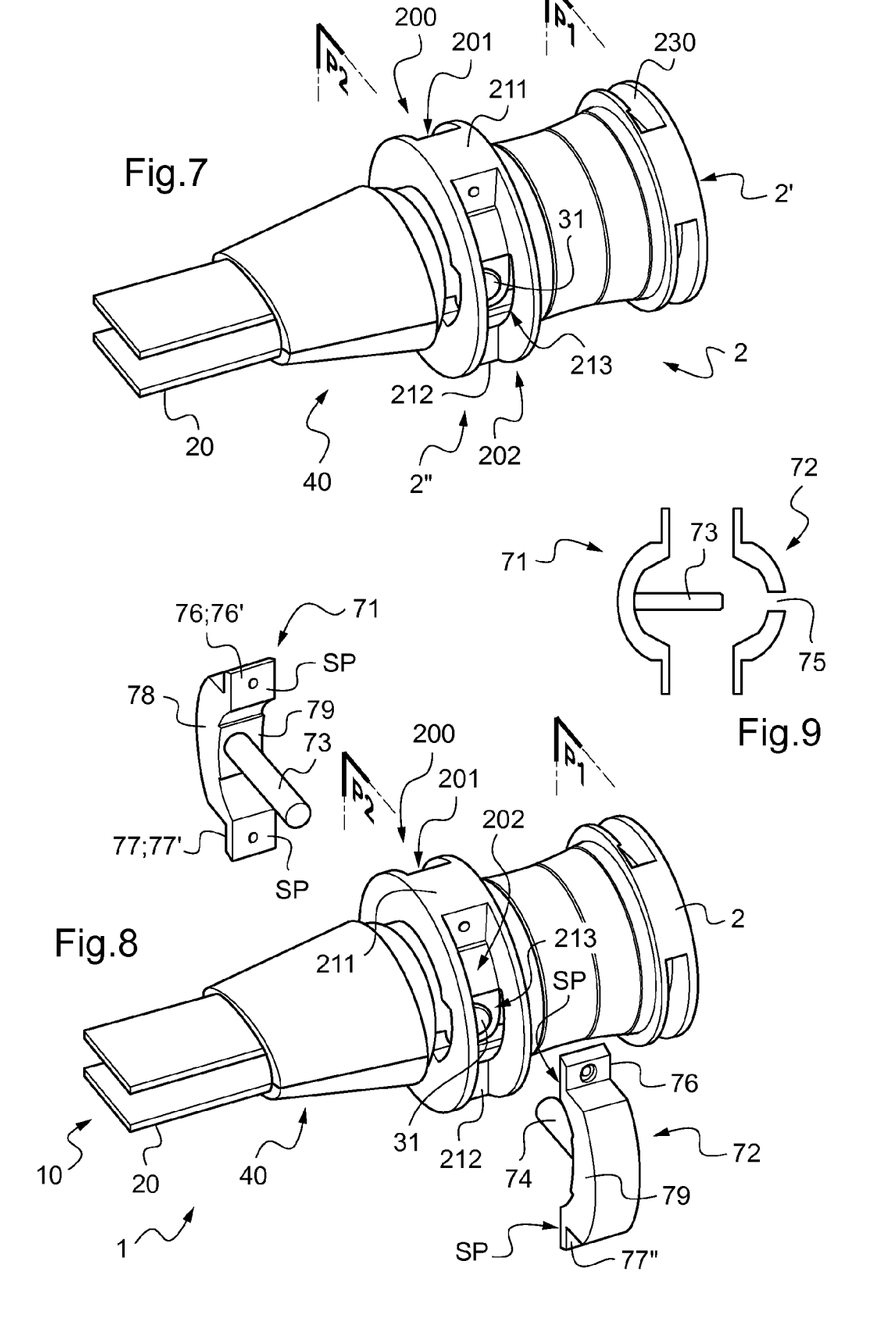
FIG. 8 is a view showing rings in a first embodiment.
FIG. 9 is a view showing rings in a second embodiment.

In another aspect, the fitting 2 includes an annular recess 200, e.g. at the second end 2". The annular recess 200 is optionally situated in a second plane P2 parallel to the first plane P1.

This annular recess is shared between a first recess 201 and a second recess 202 that are separated by a separator known as the "top" separator 211, and a separator known as the "bottom" separator 212.

The fitting 2 may also include windows 213 so that the bushing 31 opens out into the first and second recesses 201 and 202. Each window 213 may include a guide groove 220.

The first recess 201 and the second recess 202 represent peripheral housings suitable for reversibly receiving respectively a first ring and a second ring for transmitting forces.

FIG. 8 shows the first ring 71 and the second ring 72.

Each ring 71, 72 extends from a first end 76 matching the shape of the top separator 211 to a second end 77 matching the shape of the bottom separator 212, passing via a central portion facing the bushing 31.

By way of example, each end is provided with a plane surface SP for coming into contact with a plane surface of a separator. Each separator 211 and 212 is thus wedged between two plane surfaces SP.

Furthermore, at least one central portion of a ring carries a fastener pin suitable for passing at least part of the way through the bushing 31 and the fitting 2.

The centrifugal forces exerted on the aerodynamic element are then transmitted to the fitting 2 in particular via the bushing 31 and then the rings 71, 72.

For this purpose, in a first embodiment as shown in FIG. 8, each ring includes a fastener pin.

The first ring 71 then has a first fastener pin 73 while the second ring 72 is provided with a second fastener pin 74 suitable for penetrating into the first fastener pin 73.

In the second embodiment of FIG. 9, only one of the rings has a fastener pin.

Under such circumstances, the first ring 71 has a first fastener pin 73, while the second ring 72 is provided with a hole 75 for receiving the first fastener pin 73.

Figure 14:
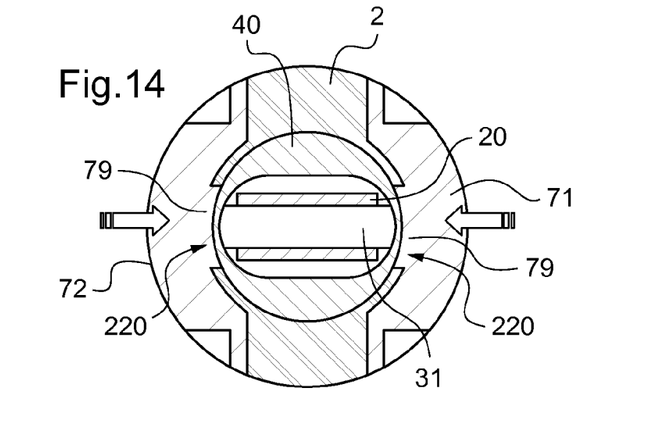
FIG. 14 is a section view showing rings locally closing a longitudinal groove in a fitting.

In another aspect, and with reference to FIG. 8 and to FIG. 14, the fitting may include at least one guide groove 220. Consequently, at least one ring 71, 72 optionally includes a projection 79 suitable for closing the guide groove 220.

Figure 10:
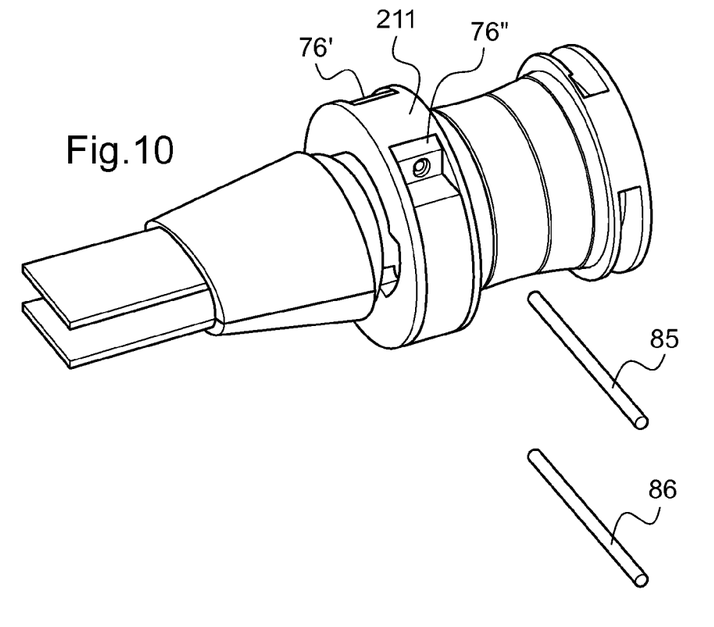
FIG. 10 is a view showing the rings being secured to a fitting.

With reference to FIG. 10, when the first and second rings 71 and 72 are in place in the first and second recesses:

the first end 76' of the first ring 71 is secured to the first end 76" of the second ring 72 and to the top separator 211 by using a first securing pin 85, such as a bolt co-operating with nuts (not shown); and the second end 77' of the first ring 71 is secured to the second end 77" of the second ring 72 and to the bottom separator 202 using a second securing pin 86, such as a bolt co-operating with nuts (not shown).

Figure 11:
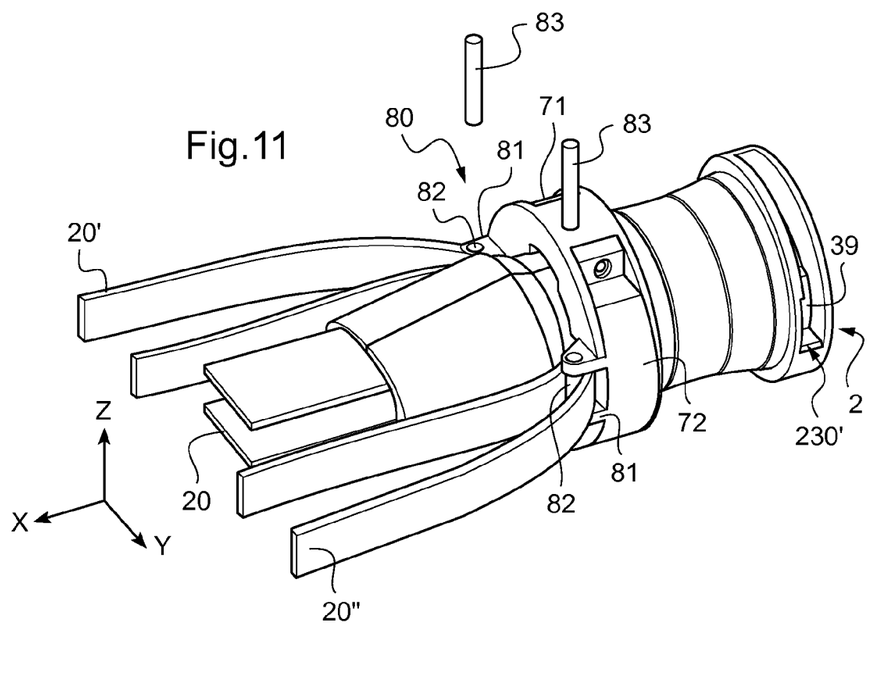
FIG. 11 is a view showing a variant of the invention having a plurality of spars.

FIG. 11 shows a variant of the invention applied to a blade having a front secondary spar 20' and a rear secondary spar 20".

Each ring then has fastener means 80 for fastening a secondary spar.

Consequently, each fastener means 80 may include a clevis 81 fastened to the central portion of a ring, the clevis co-operating with a cylindrical sleeve 82 of a secondary spar and a connection pin 83.

Figure 12:
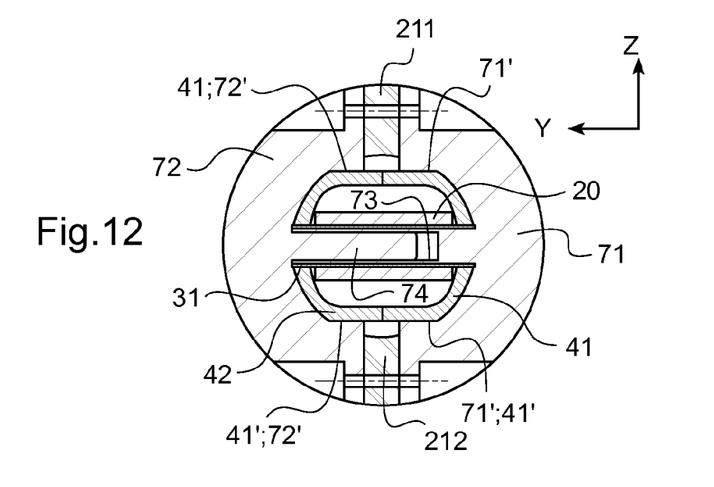
FIGS. 12 and 13 are section views showing a version of the invention using a first flat and a second flat.
Figure 13:
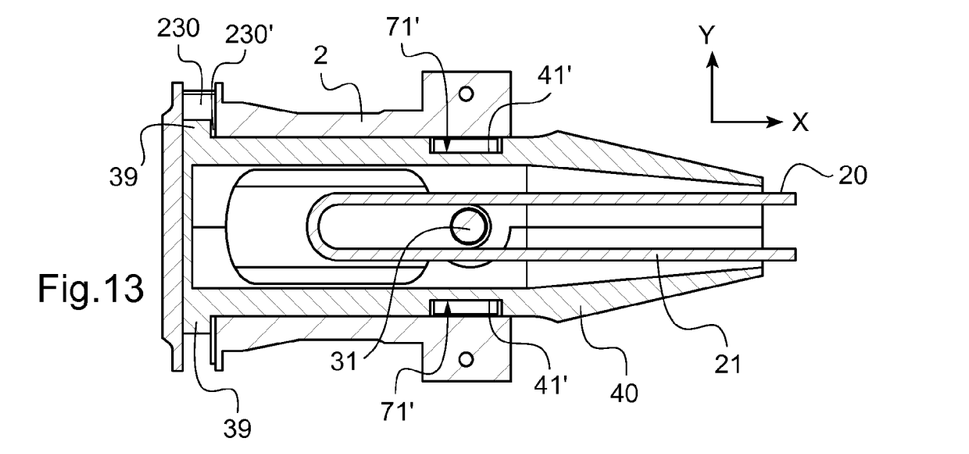

Furthermore, with reference to FIGS. 12 and 13, the blade may include optimized means for preventing turning.

These means for preventing turning include at least one first flat 41 formed in the first portion of the transmission member.

In addition, the means for preventing turning include at least one second flat 71', 72' complementary to the first flat and arranged on at least one ring.

By way of example, the transmission member has a top first flat and a bottom first flat. Similarly, each ring has in its central portion a top second flat and a bottom second flat.

Under such circumstances, the transmission member is prevented from turning in the fitting.

Furthermore, it should be recalled that the transmission member serves in particular to transmit torsional forces from the aerodynamic element to the fitting.

This embodiment then enables these torsional forces to transit from the transmission member to the rings via the flats without passing via the fastener pins of the rings. In contrast, the centrifugal forces transit from the bushing 31 to said fastener pins.

Thus, the paths followed by centrifugal forces and by torsional forces are well separated.

Furthermore, with reference to FIGS. 11 and 13, each slideway 230 may include an axial housing 230' facing a lug 39 when the transmission member 40 is locked to the fitting 2.

Thus, in the event of fastener pins 73, 74 or indeed securing pins 85, 86 accidentally breaking in flight, the centrifugal forces exerted on the blade tend to move the transmission member 40 axially relative to the fitting 2.

Each lug then penetrates into an axial housing 230'. It can be understood that each axial housing 230' prevents the transmission member 40 from moving in translation relative to the fitting 2 along the first direction X, and prevents the transmission member from turning relative to the fitting 2.

The axial housing thus constitutes emergency means for securing the transmission member 40 to the fitting 2.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A blade having a fitting for fastening to a hub and an aerodynamic element having a main spar extending spanwise from an attachment zone towards a distal zone, said attachment zone surrounding a bushing for transmitting centrifugal forces and connected to said fitting, said blade including a transmission member for transmitting torsional forces and provided with a first half-shell and a second half-shell together clamping on said attachment zone, each half-shell having a first portion co-operating with said bushing and a second portion co-operating with a torsion box surrounding said distal zone, said first portion being inserted in said fitting, wherein said fitting includes an annular recess defining a first recess and a second recess that are separated by a top separator and a bottom separator locally obstructing the annular recess, and the blade includes a first ring and a second ring reversibly arranged respectively in the first recess and in the second recess, each ring being fastened to the top separator and to the bottom separator, a ring including a fastener pin passing through said bushing and said fitting in co-operation with the other ring.

2. A blade according to claim 1, wherein said first ring has a first fastener pin, said second ring being provided with a second fastener pin suitable for penetrating in said first fastener pin.

3. A blade according to claim 1, wherein said first ring includes a first fastener pin, said second ring being provided with a hole suitable for receiving said first fastener pin.

4. A blade according to claim 1, wherein said blade includes a front secondary spar and a rear secondary spar, and each ring includes fastener means for fastening to a secondary spar.

5. A blade according to claim 1, wherein each ring extends from a first end towards a second end, and the blade possesses a first securing pin for securing the first end of the first ring to the first end of the second ring and to the top separator, the blade also possessing a second securing pin securing the second end of the first ring to the second end of the second ring and to the bottom separator.

6. A blade according to claim 5, wherein each end has a plane surface (SP), with each separator being clamped between two plane surfaces (SP).

7. A blade according to claim 1, wherein said fitting has at least one guide groove co-operating with a lug of a shell, and at least one ring includes a projection suitable for closing said guide groove in order to seal it.

8. A blade according to claim 7, wherein each guide groove opens out into a circularly arcuate slideway contained in a first plane (P1) parallel to a second plane (P2) containing the first and second recesses.

9. A blade according to claim 1, wherein each half-shell includes an eyelet suitable for clamping onto a first end portion of said bushing, each half-shell having an oblong viewing hole.

10. A blade according to claim 1, wherein each half-shell includes an eyelet suitable for clamping onto an end portion of said bushing, and a zone matching the shape of the eyelet of the other half-shell.

11. A blade according to claim 1, wherein at least a first portion of the half-shells include a first flat, and at least one ring includes a second flat complementary to the first flat.

12. A blade according to claim 8, wherein each slideway includes an axial housing facing a lug when the transmission member is locked to the fitting so as to prevent a lug from moving in an axial housing in the event of the transmission member moving accidentally in translation relative to the fitting.

* * * * *